(12) United States Patent
VanderZee

(10) Patent No.: US 7,656,115 B2
(45) Date of Patent: Feb. 2, 2010

(54) CALIBRATING STEPPER MOTOR BY DRIVING FRACTIONAL RANGES

(75) Inventor: Joel C. VanderZee, La Crosse, WI (US)

(73) Assignee: Trane International Inc., Piscataway, NJ (US)

(*) Notice: Subject to any disclaimer, the term of this patent is extended or adjusted under 35 U.S.C. 154(b) by 475 days.

(21) Appl. No.: 11/818,821

(22) Filed: Jun. 15, 2007

(65) Prior Publication Data
US 2008/0309280 A1    Dec. 18, 2008

(51) Int. Cl.
*H02P 8/00* (2006.01)
*G05B 19/40* (2006.01)

(52) U.S. Cl. .................. 318/696; 318/114; 318/116; 318/685

(58) Field of Classification Search ............ 318/696, 318/685, 114, 116; 388/811, 829
See application file for complete search history.

(56) References Cited

U.S. PATENT DOCUMENTS

| | | | |
|---|---|---|---|
| 4,523,436 A | 6/1985 | Schedel et al. | |
| 4,593,881 A | 6/1986 | Yoshino | |
| 4,628,499 A * | 12/1986 | Hammett | 700/56 |
| 5,260,811 A * | 11/1993 | Morikawa | 358/474 |
| 5,481,187 A * | 1/1996 | Marcott et al. | 324/207.16 |
| 5,485,070 A * | 1/1996 | Tominaga | 318/696 |
| 5,578,904 A * | 11/1996 | Marcott et al. | 324/207.16 |
| 5,600,237 A * | 2/1997 | Nippert | 324/207.16 |
| 5,665,897 A | 9/1997 | Lippmann et al. | |
| 5,942,872 A | 8/1999 | Steger et al. | |
| 6,301,441 B1 * | 10/2001 | Kato | 396/131 |
| 6,462,497 B1 * | 10/2002 | Rinsma et al. | 318/567 |
| 6,853,162 B2 | 2/2005 | Betts et al. | |
| 7,460,444 B2 * | 12/2008 | Shime | 369/44.11 |
| 2001/0017824 A1 * | 8/2001 | Okada et al. | 369/32 |
| 2002/0050898 A1 * | 5/2002 | Olsson | 335/220 |
| 2003/0102828 A1 * | 6/2003 | Kusakabe | 318/114 |
| 2003/0102838 A1 | 6/2003 | Fyfe | |
| 2003/0214265 A1 | 11/2003 | VanderZee et al. | |

(Continued)

FOREIGN PATENT DOCUMENTS

FR    2 567 660    1/1986

OTHER PUBLICATIONS

"Spontaneous Speed Reversals in Stepper Motors"; Marc Bodson, Jeffrey S. Sato and Stephen R. Silver; IEEE Transactions on Control Systems Tech., vol. 14, No. 2, Mar. 2006.

*Primary Examiner*—Paul Ip
(74) *Attorney, Agent, or Firm*—William O'Driscoll

(57) ABSTRACT

A stepper motor driving a driven member is calibrated by periodically driving the member from its current operational position to an end stop of the driven member's total travel range; however, the driven member approaches the end stop in a series of ever-shorter travel segments. The first travel segment is less than ⅓ the total travel range to compensate for a possible sudden speed reversal, which can be accidentally triggered by the driven member reaching and "bouncing off" the end stop. Limiting the commanded first travel segment to less than ⅓ the total travel range prevents the driven member from reaching an opposite travel limit should the driven member suddenly reverse direction at three times the normal forward speed, wherein such triple speed is characteristic of reverse-speed situations.

27 Claims, 2 Drawing Sheets

U.S. PATENT DOCUMENTS

| | | |
|---|---|---|
| 2005/0047290 A1* | 3/2005 | Okada et al. ............ 369/44.28 |
| 2005/0061090 A1* | 3/2005 | Oberndorfer et al. ....... 73/865.9 |
| 2005/0083800 A1* | 4/2005 | Okada et al. ............ 369/44.28 |
| 2006/0055360 A1 | 3/2006 | Reiter et al. |
| 2006/0113933 A1* | 6/2006 | Blanding et al. ............ 318/116 |
| 2007/0040529 A1* | 2/2007 | Takebayashi et al. ....... 318/685 |
| 2007/0098373 A1* | 5/2007 | Saito et al. .................. 388/811 |
| 2007/0247092 A1* | 10/2007 | Komatsu et al. ............ 318/254 |
| 2007/0280082 A1* | 12/2007 | Takahashi et al. ...... 369/112.01 |
| 2007/0296804 A1* | 12/2007 | Itoga et al. .................. 347/262 |
| 2008/0002015 A1* | 1/2008 | Itoga et al. .................. 347/224 |
| 2008/0106293 A1* | 5/2008 | Hashimoto ................. 324/760 |
| 2009/0148138 A1* | 6/2009 | Sciuto et al. ................ 388/829 |

\* cited by examiner

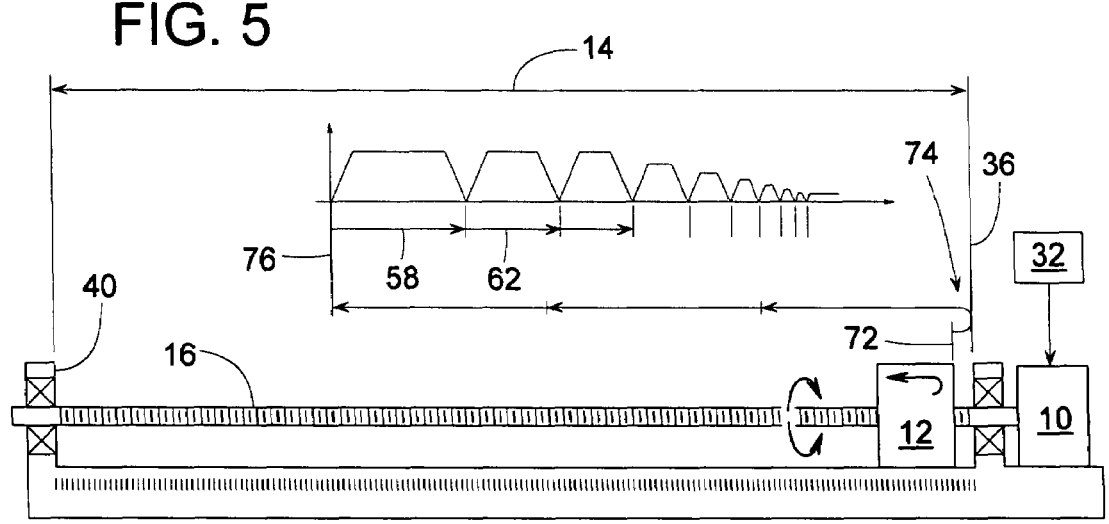
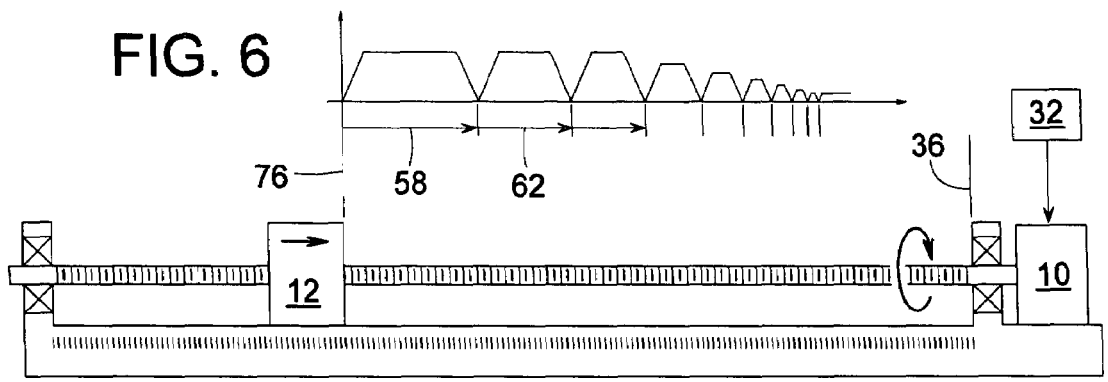
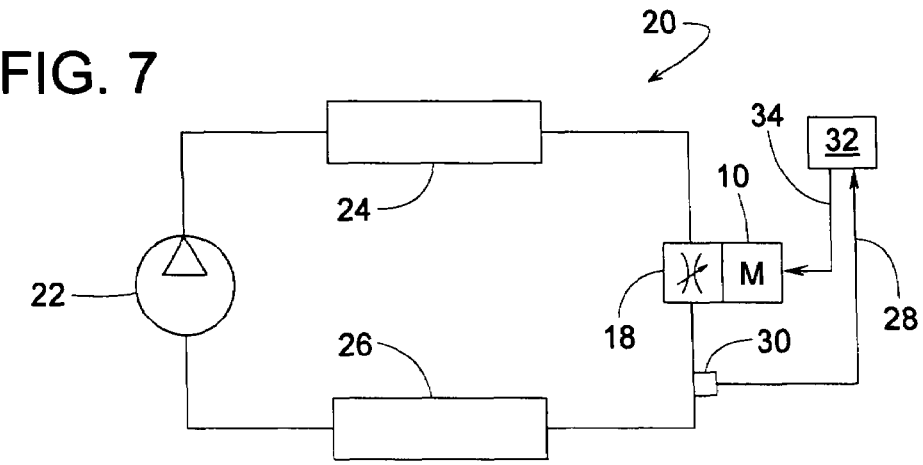

CALIBRATING STEPPER MOTOR BY DRIVING FRACTIONAL RANGES

FIELD OF THE INVENTION

The subject invention generally pertains to stepper motors and more specifically to a calibration method that compensates for unexpected speed reversals.

BACKGROUND OF RELATED ART

A stepper motor uses discrete electrical pulses in a certain sequence to create rotating electrical fields that drive a magnetic rotor in controlled rotational steps. The frequency of the pulses directly affects the rotor's speed, the number of pulses directly affects the length of rotation, and the sequence of the pulses generally determines the rotational direction.

Occasionally, however, stepper motors unexpectedly run counter to the intended direction of rotation. When this occurs, the reverse rotation is about three times faster than the normal forward speed. This phenomenon is explained in a paper entitled, "Spontaneous Speed Reversals in Stepper Motors" by Marc Bodson, Jeffrey S. Sato and Stephen R. Silver. The paper was published by IEEE Transactions on Control Systems Technology, Vol. 14, No. 2, March 2006.

Spontaneous speed reversal can be particularly problematic when a stepper motor is calibrated by driving the motor to a known travel limit or end stop. Under normal calibration, the stepper motor is periodically driven to the end stop to re-establish a known datum. It has been found, however, that striking the end stop can trigger the rapid speed reversal. So, instead of stopping at the end stop, the stepper motor might "bounce off" and move rapidly away from it. In some cases, the stepper motor might even travel all the way over to an opposite travel limit, thus failing to ever find the datum.

Although mechanical or electrical damping, micro-stepping, and closed-loop control might reduce the likelihood of spontaneous speed reversal, such measures can be expensive and/or they can reduce the motor's speed and responsiveness. Consequently, a need exists for a better method of avoiding or compensating for sudden speed reversal in a stepper motor, particularly during calibration.

SUMMARY OF THE INVENTION

It is an object of the invention to avoid or compensate for a sudden, unexpected speed reversal of a stepper motor.

Another object of some embodiments is to calibrate a stepper motor by driving it toward a home travel limit but do so in ever shorter segments, wherein the first segment is less than one third of the motor's total travel range so that if the motor were to suddenly reverse direction at the home position and at three times the normal speed, the motor would not reach an opposite travel limit.

Another object of some embodiments is to calibrate a stepper motor by driving it toward a home travel limit but do so by periodically stopping or nearly stopping the motor before it reaches the travel limit.

Another object of some embodiments is to calibrate a stepper motor by driving it toward a home travel limit but do so by periodically decelerating and accelerating the motor before it reaches the travel limit, wherein the periods of acceleration and deceleration occur over multiple steps (multiple pulses) of the stepper motor.

Another object of some embodiments is to calibrate an electronic expansion valve of a refrigerant system while avoiding or compensating for sudden, unexpected speed reversal of a stepper motor.

One or more of these and/or other objects of the invention are provided by a stepper motor that is calibrated by driving the motor to a travel limit position, wherein the motor is driven over ever decreasing segments that are less than one third of the motor's total or remaining travel range.

The present invention provides a method for calibrating a stepper motor that drives a driven member over a travel range having a travel limit. The stepper motor can move the driven member to an operational point within the travel range. The method comprises commanding the stepper motor to move the driven member over a travel distance from the operational point to the travel limit; and as the stepper motor moves the driven member from the operational point to the travel limit, commanding the stepper motor to periodically slow down, thereby creating a plurality of periods of relatively fast movement each separated by a period of slower movement. The plurality of periods of relatively fast movement become shorter in distance as the driven member approaches the travel limit.

The present invention also provides a method for calibrating a stepper motor that drives a driven member over a travel range having a travel limit. The stepper motor can move the driven member to an operational point within the travel range. The method comprises commanding the stepper motor to move the driven member over a travel distance from the operational point to the travel limit and doing so through a plurality of periods of continuous movement, commanding the stepper motor to stop the driven member between the plurality of periods of continuous movement; and defining a reference point upon the driven member having reached the travel limit following the plurality of periods of continuous movement. The plurality of periods of continuous movement become shorter as the driven member approaches the travel limit.

The present invention further provides a method of calibrating a stepper motor wherein the motor has a characteristic number of positions before a motor position cycle is repeated and wherein the motor moves a device over a known range of steps. The method comprises the steps of: initializing a calibration interval to be greater than the known range of steps; setting a next step value equal to ((1/number of positions)*calibration interval); driving the motor a number of steps equal to the next step value; determining if the calibration interval is less than a stop value; if yes, commencing a stopping sequence; or if no, modifying the calibration interval to equal ((number of positions−1)/number of positions)*calibration interval, and returning to the setting step.

BRIEF DESCRIPTION OF THE DRAWINGS

FIG. 5 is a schematic diagram of the system of FIG. 1 but showing the stepper motor suddenly reversing direction as the driven member encounters the travel limit.

FIG. 6 is a schematic diagram similar to FIG. 5 but showing the driven member correcting its course after first reversing direction.

FIG. 7 is a schematic diagram of a refrigerant system employing the stepper motor system of FIGS. 1-6.

DESCRIPTION OF THE PREFERRED EMBODIMENT

Figure 1:
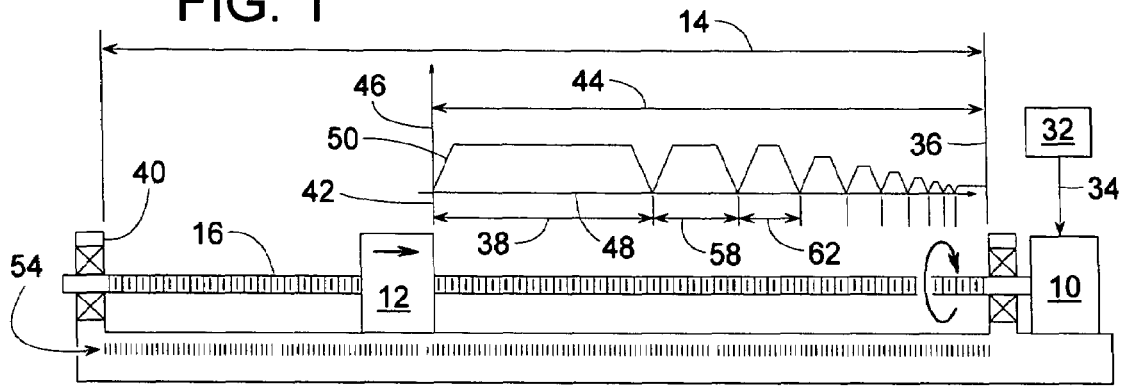
FIG. 1 is a schematic diagram of a stepper motor system being calibrated by driving a driven member toward a travel limit.

A stepper motor 10, shown in FIGS. 1-7, is shown driving a driven member 12 over a travel range 14. Stepper motor 10 is schematically illustrated to represent any electromechanical device that uses discrete electrical pulses in a certain sequence to create rotating electrical fields that drive a magnetic rotor in controlled rotational steps. The subject invention is particularly suited for permanent magnet stepper motors; however, the invention might also apply to other types of stepper motors as well. The structure and function of permanent magnet stepper motors and other types of stepper motors are well known to those of ordinary skill in the art.

For illustration, motor 10 rotates a lead screw 16 that moves member 12 to the right or left depending on the motor's direction of rotation. Although a lead screw is shown coupling motor 10 to driven member 12, it should be appreciated by those of ordinary skill in the art that any suitable mechanism (rotational, linear, pivotal linkage, etc.) could be used to couple a stepper motor to a driven member. Driven member 12 is schematically illustrated to represent any structure moved in translation and/or rotation by a stepper motor.

An example of driven member 12 includes, but is not limited to, a valve plug or spool of an electronic expansion valve 18 used in a refrigerant system 20, wherein system 20 comprises a refrigerant compressor 22, a condenser 24 and an evaporator 26. In response to an input signal 28 from a sensor 30 that senses an operating condition of system 20, a microcomputer controller 32 provides an output signal 34 that commands stepper motor 10 to adjust the opening of valve 18.

Regardless of what type of driven member 12 that motor 10 is driving, the stepper motor system might need to be calibrated periodically to establish a known datum when electrical power is restored to the controller or to correct for any slippage that may have occurred between the motor's rotor and its driving pulsating field. To do this, controller 32 commands motor 10 to drive driven member 12 from its current position to a predetermined travel limit 36 that defines a reference point. However, to compensate for a possible speed reversal during the calibration process, stepper motor 10 drives driven member 12 in ever-shorter segments toward travel limit 36, wherein a first segment 38 is less than ⅓ of the total travel range 14 so that a 3-times speed reversal is unable to move driven member 12 all the way back to an opposite end stop 40. The calibration, for example, might proceed as shown in FIGS. 1-4.

In FIG. 1, driven member 12 is shown at an operational point 42 that is a travel distance 44 away from travel limit 36. Controller 32 first commands motor 10 to move driven member 12 from point 42 to travel limit 36 and do so over first period 38 that is, for example, 25% the length of range 14 or certainly less than ⅓ of range 14. To plot the movement, a vertical axis 46 represents the speed of driven member 12, and a horizontal axis 48 represents the driven member's position along range 14. A positive slope 50 indicates that driven member 12 is accelerating, and a negative slope 52 represents deceleration. A series of dashes represents a plurality of steps 54, wherein each step is the smallest discrete increment that member 12 can be driven controllably by stepper motor 10. It should be noted that the acceleration and deceleration of driven member 12 occurs over multiple steps 54. It should also be noted that the plotted speed/position profiles are not necessarily to scale.

Figure 2:
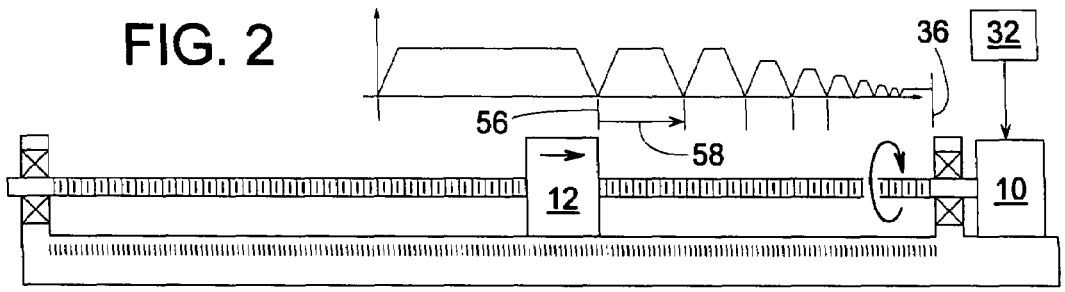
FIG. 2 is a schematic diagram similar to FIG. 1 but showing the driven member closer to the travel limit.

FIG. 2 shows driven member 12 having reached a position 56 at which point controller 32 commands motor 10 to reaccelerate driven member 12 to move member 12 over a second period 58 that is shorter than first period 38. Second period 58, for example, could be 75% the length of first period 38. Although the brief period of deceleration/acceleration at position 56 might be adequate, it is preferable for controller 32 to command motor 10 to actually stop driven member 12 momentarily at position 56 so that member 12 periodically pauses between periods of movement. The pause, however, is relatively brief and preferably consumes less time than each period of acceleration or deceleration.

Figure 3:
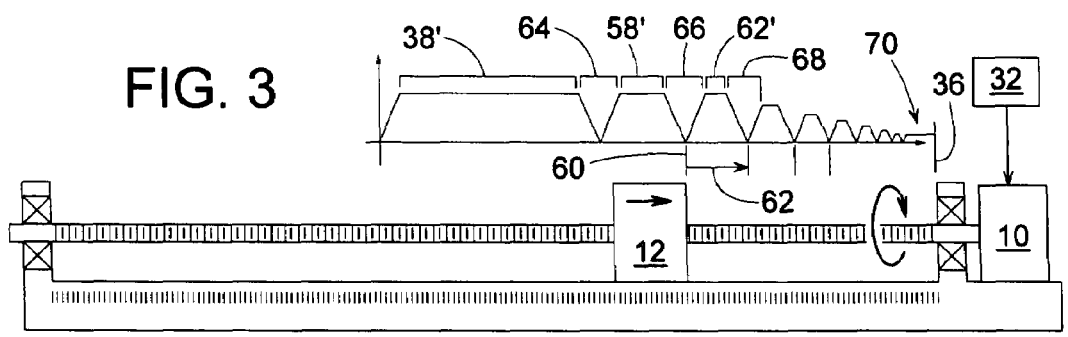
FIG. 3 is a schematic diagram similar to FIGS. 1 and 2 but showing the driven member even closer to the travel limit.
Figure 4:
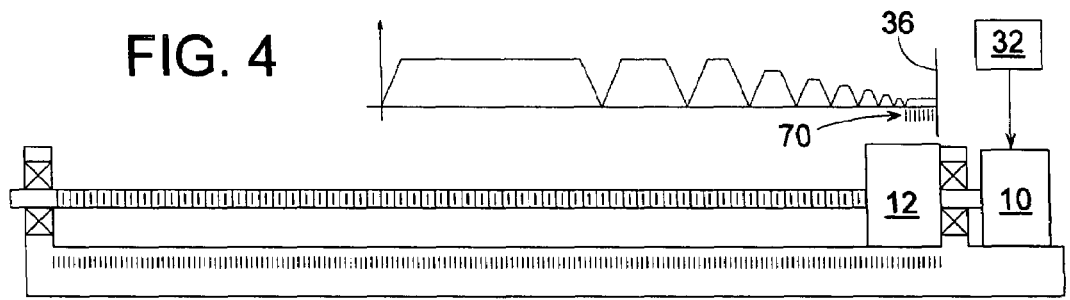
FIG. 4 is a schematic diagram similar to FIG. 1 but showing the driven member at the travel limit.

Next, FIG. 3 shows driven member 12 having reached a position 60 at which point controller 32 once again commands motor 10 to reaccelerate driven member 12 to travel over a third period 62 toward travel limit 36. Driven member 12 thus travels over a plurality of periods of relatively fast, continuous movement (e.g., periods 38', 58' and 62') each separated by a period of slower movement (e.g., periods 64, 66 and 68). Third period 62 is shorter than second period 58; for example, period 62 could be 75% the length of second period 58. The process of driving member 12 in ever-shorter segments toward travel limit 36 continues until member 12 reaches limit 36 or is just a few steps away, wherein motor 10 can drive member 12 those few remaining steps 70 (FIG. 4). If a sudden speed reversal were to occur within the last few steps 70, the total reverse travel distance away from travel limit 36 would be negligible. Since the plotted speed/position profile is not necessarily to scale, the total number of periods (e.g., periods 38, 58, 62, etc.) can be more or less than the number shown, and in some cases, the longer periods, such as periods 38, 58 and 62, will be sufficient to move member 12 all the way over to position 36 without member 12 ever having to move in discrete steps 70 at the very end of the approach.

FIG. 4 shows driven member 12 having reached travel limit 36 at which point controller 32 can re-establish the location of the reference point defined by limit 36.

FIGS. 5 and 6 illustrate perhaps a worst-case scenario where a calibration process begins with driven member 12 being at an operational point 72 that is quite close to travel limit 36, and a sudden 3-times speed reversal 74 occurs within a first period of the calibration. The speed reversal moves driven member 12 back to a position 76 that might be just short of opposite limit 40. Nonetheless, controller 32 subsequently commands motor 10 to move driven member 12 toward travel limit 36 in a sequential step-like manner similar to that described with reference to FIGS. 1-4.

The invention can be characterized as a method of calibrating a stepper motor wherein the motor has a characteristic number of positions before a motor position cycle is repeated and wherein the motor moves a device over a known range of steps. The method comprises the steps of: initializing a calibration interval to be greater than the known range of steps; setting a next step value equal to ((1/number of positions) *calibration interval); driving the motor a number of steps equal to the next step value; determining if the calibration interval is less than a stop value; if yes, commencing a stopping sequence; or if no, modifying the calibration interval to equal (((number of positions−1)/number of positions)*calibration interval), and returning to the setting step.

Although the invention is described with respect to a preferred embodiment, modifications thereto will be apparent to those of ordinary skill in the art. The scope of the invention, therefore, is to be determined by reference to the following claims:

The invention claimed is:

1. A method for calibrating a stepper motor that drives a driven member over a travel range having a travel limit, wherein the stepper motor can move the driven member to an operational point within the travel range, the method comprising:

commanding the stepper motor to move the driven member over a travel distance from the operational point to the travel limit; and as the stepper motor moves the driven member from the operational point to the travel limit, commanding the stepper motor to periodically slow down, thereby creating a plurality of periods of relatively fast movement each separated by a period of slower movement, wherein the plurality of periods of relatively fast movement become shorter in distance as the driven member approaches the travel limit.

2. The method of claim 1, further comprising commanding the stepper motor to stop the driven member momentarily during the period of slower movement.

3. The method of claim 1, wherein the plurality of periods of relatively fast movement includes a first period during which the driven member travels less than one third the travel range.

4. The method of claim 1, further comprising defining a reference point upon the driven member having reached the travel limit.

5. The method of claim 1, wherein the driven member is part of an electronic expansion valve of a refrigerant system.

6. A method for calibrating a stepper motor that drives a driven member over a travel range having a travel limit, wherein the stepper motor can move the driven member to an operational point within the travel range, the method comprising:

commanding the stepper motor to move the driven member over a travel distance from the operational point to the travel limit; and as the stepper motor moves the driven member from the operational point to the travel limit, commanding the stepper motor to periodically stop the driven member, thereby creating a plurality of periods of movement each separated by a pause, wherein the plurality of periods of movement become shorter in distance as the driven member approaches the travel limit.

7. The method of claim 6, wherein the plurality of periods of movement includes a first period over which the driven member travels less than one third the travel range.

8. The method of claim 6, further comprising decelerating the stepper motor over a plurality of steps prior to the pause.

9. The method of claim 8, wherein deceleration of the stepper motor consumes more time than the pause.

10. The method of claim 6, further comprising accelerating the stepper motor over a plurality of steps following the pause.

11. The method of claim 10, wherein acceleration of the stepper motor consumes more time than the pause.

12. The method of claim 6, wherein the driven member is part of an electronic expansion valve of a refrigerant system.

13. A method for calibrating a stepper motor that drives a driven member over a travel range having a travel limit, wherein the stepper motor can move the driven member to an operational point within the travel range, the method comprising:

commanding the stepper motor to move the driven member over a travel distance from the operational point to the travel limit and doing so through a plurality of periods of continuous movement, wherein the plurality of periods of continuous movement become shorter as the driven member approaches the travel limit;

commanding the stepper motor to stop the driven member between the plurality of periods of continuous movement; and defining a reference point upon the driven member having reached the travel limit following the plurality of periods of continuous movement.

14. The method of claim 13, wherein the plurality of periods of continuous movement includes a first period over which the driven member travels less than one third the travel range.

15. The method of claim 13, further comprising decelerating the stepper motor over a plurality of steps prior to stopping the driven member between the plurality of periods of continuous movement.

16. The method of claim 13, further comprising after stopping the driven member between the plurality of periods of continuous movement, accelerating the stepper motor over a plurality of steps.

17. The method of claim 13, wherein the driven member is part of an electronic expansion valve of a refrigerant system.

18. A system for calibrating a stepper motor, the system comprising:

a driven member;

a stepper motor that drives the driven member over a travel range having a travel limit, wherein the stepper motor can move the driven member to an operational point within the travel range;

a controller operatively connected to and commanding the stepper motor to move the driven member over a travel distance from the operational point to the travel limit, wherein as the stepper motor moves the driven member from the operational point to the travel limit, the controller commands the stepper motor to periodically slow down or stop, thereby creating a plurality of periods of relatively fast movement each separated by a period of slower movement, wherein the plurality of periods of relatively fast movement become shorter in distance as the driven member approaches the travel limit.

19. The system of claim 18, wherein the controller commands the stepper motor to stop the driven member momentarily during the period of slower movement.

20. The system of claim 18, wherein the plurality of periods of relatively fast movement includes a first period during which the driven member travels less than one third the travel range.

21. The system of claim 18, further comprising defining a reference point upon the driven member having reached the travel limit.

22. The system of claim 18, wherein the driven member is part of an electronic expansion valve of a refrigerant system.

23. The system of claim 18, wherein the plurality of periods of movement includes a first period over which the driven member travels less than one third the travel range.

24. The system of claim 18, further comprising decelerating the stepper motor over a plurality of steps prior to the pause.

25. The system of claim 24, wherein deceleration of the stepper motor consumes more time than the pause.

26. A method of calibrating a stepper motor wherein the motor has a characteristic number of positions before a motor position cycle is repeated and wherein the motor moves a device over a known range of steps, the method comprising the steps of:

initializing a calibration interval to be greater than the known range of steps;

setting a next step value equal to ((1/number of positions) *calibration interval);

driving the motor a number of steps equal to the next step value;

determining if the calibration interval is less than a stop value;

if yes, commencing a stopping sequence; or if no, modifying the calibration interval to equal (((number of positions−1)/number of positions)*calibration interval), and returning to the setting step.

27. A system for calibrating a stepper motor, the system comprising:

a stepper motor wherein the motor has a characteristic number of positions before a motor position cycle is repeated and wherein the motor moves a device over a known range of steps; and a controller operatively connected to and commanding the stepper motor, the controller initializing a calibration interval to be greater than the known range of steps; setting a next step value equal to ((1/number of positions)*calibration interval); driving the motor a number of steps equal to the next step value; determining if the calibration interval is less than a stop value; if yes, commencing a stopping sequence; or if no, modifying the calibration interval to equal (((number of positions−1)/number of positions)*calibration interval), and returning to the setting step.

* * * * *